US012620137B2

(12) United States Patent
Gao et al.

(10) Patent No.: US 12,620,137 B2
(45) Date of Patent: May 5, 2026

(54) SYSTEMS AND METHOD FOR ADAPTIVE FILTERING IN PATCH GENERATION FOR VIDEO-BASED POINT CLOUD CODING

(71) Applicant: Tencent America LLC, Palo Alto, CA (US)

(72) Inventors: Wen Gao, West Windsor, NJ (US); Xiang Zhang, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 583 days.

(21) Appl. No.: 17/982,923

(22) Filed: Nov. 8, 2022

(65) Prior Publication Data

US 2023/0177737 A1 Jun. 8, 2023

Related U.S. Application Data

(60) Provisional application No. 63/286,434, filed on Dec. 6, 2021.

(51) Int. Cl.
 *G06T 9/00* (2006.01)
 *G06T 17/00* (2006.01)
 *G06T 17/20* (2006.01)

(52) U.S. Cl.
 CPC ............ *G06T 9/001* (2013.01); *G06T 17/005* (2013.01); *G06T 17/205* (2013.01)

(58) Field of Classification Search
 CPC ...... G06T 9/001; G06T 17/005; G06T 17/205
(Continued)

(56) References Cited

U.S. PATENT DOCUMENTS

2003/0067461 A1* 4/2003 Fletcher .................. G06T 17/20
 345/420
2019/0087979 A1 3/2019 Mammou et al.
(Continued)

FOREIGN PATENT DOCUMENTS

CN 105719348 A 6/2016
EP 3 767 953 A1 1/2021

OTHER PUBLICATIONS

Chunhan Zhang, Hao Yin, and Shanghua Xiao. 2018. Adaptive Sampling for GPU-based 3-D Volume Rendering. In Proceedings of the 2nd International Symposium on Image Computing and Digital Medicine (ISICDM 2018). Association for Computing Machinery, New York, NY, USA, 27-31. (Year: 2018).*
(Continued)

*Primary Examiner* — Chineyere Wills-Burns
*Assistant Examiner* — Lucius Cameron Gree Allen
(74) *Attorney, Agent, or Firm* — Sughrue Mion, PLLC

(57) ABSTRACT

Provided are a method, apparatus, and non-transitory computer readable medium for adaptive filtering in patch generation for video-based point cloud coding. The method includes projecting points included in a connected component (CC) to a projection plane associated with the CC, and removing one or more outlier points to generate an updated CC; determining a first surface by selecting one or more points associated with the updated CC; adaptively filtering the one or more points selected for the first surface, by adjusting a grid size parameter based on one or more characteristics of the CC; determining a second surface by selecting one or more points associated with the updated CC; adding a patch corresponding to the filtered first surface and the second surface to a list of patches associated with an original point cloud; and coding the original point cloud based on the list of patches.

19 Claims, 7 Drawing Sheets

100

(58) Field of Classification Search
USPC .......................................................... 382/232
See application file for complete search history.

(56)                      References Cited

U.S. PATENT DOCUMENTS

| | | | | |
|---|---|---|---|---|
| 2020/0104976 | A1* | 4/2020 | Mammou | G06T 9/00 |
| 2020/0107028 | A1 | 4/2020 | Vosoughi et al. | |
| 2020/0221134 | A1* | 7/2020 | Faramarzi | H04N 19/597 |
| 2020/0294271 | A1* | 9/2020 | Ilola | G06T 17/20 |
| 2020/0296401 | A1* | 9/2020 | Lee | G06T 3/4023 |
| 2021/0019900 | A1* | 1/2021 | Ohta | G06T 7/73 |
| 2021/0248815 | A1* | 8/2021 | Kim | G06V 10/764 |
| 2021/0383576 | A1* | 12/2021 | Olivier | G06T 9/001 |
| 2022/0068017 | A1* | 3/2022 | Lee | G06T 7/593 |
| 2022/0172404 | A1* | 6/2022 | Kim | G06T 3/40 |
| 2022/0222824 | A1* | 7/2022 | Usumezbas | G06T 3/40 |

OTHER PUBLICATIONS

D. T. Nguyen, M. Quach, G. Valenzise and P. Duhamel, "Learning-Based Lossless Compression of 3D Point Cloud Geometry," ICASSP 2021-2021 IEEE International Conference on Acoustics, Speech and Signal Processing (ICASSP), Toronto, ON, Canada, 2021, pp. 4220-4224 (Year: 2021).*

R. L. de Queiroz and P. A. Chou, "Compression of 3D Point Clouds Using a Region-Adaptive Hierarchical Transform," in IEEE Transactions on Image Processing, vol. 25, No. 8, pp. 3947-3956, Aug. 2016 (Year: 2016).*

D. Ai, H. Lu, Y. Yang and Y. Liu, "An Adaptive Feature-based Quantization Algorithm for Point Cloud Compression," 2021 Picture Coding Symposium (PCS), Bristol, United Kingdom, 2021, pp. 1-5 (Year: 2021).*

Jonathan Kuck et al., Approximating the Permanent by Sampling from Adaptive Partitions, 2019, Curran Associates, Inc. (Year: 2019).*

Graziosi D, Nakagami O, Kuma S, Zaghetto A, Suzuki T, Tabatabai A. An overview of ongoing point cloud compression standardization activities: video-based (V-PCC) and geometry-based (G-PCC). APSIPA Transactions on Signal and Information Processing. 2020;9:e13 (Year: 2020).*

International Search Report dated Feb. 28, 2023 in International Application No. PCT/US2022/049506.

Written Opinion dated Feb. 28, 2023 in International Application No. PCT/US2022/049506.

"V-PCC Codec Description", ISO/IEC JTC 1/SC 29/WG 7, N00012, MPEG 3D Graphics Coding, Dec. 1, 2020, 73 pages.

Rufael Mekuria et al., "Requirements for Point Cloud Compression", International Organisation for Standardisation Organisation Internationale de Normalisation ISO/IEC JTC1/SC29/WG11 Coding of Moving Pictures and Audio, ISO/IEC JTC1/SC29/WG11 MPEG2016/n16330, Feb. 2016, 3 pages.

Christian Tulvan et al., "Use Cases for Point Cloud Compression (PCC)", International Organisation for Standardisation Organisation Internationale de Normalisation ISO/IEC JTC1/SC29/WG11 Coding of Moving Pictures and Audio, ISO/IEC JTC1/SC29/WG11 MPEG2015/ N16331, Jun. 2016, 8 pages.

* cited by examiner

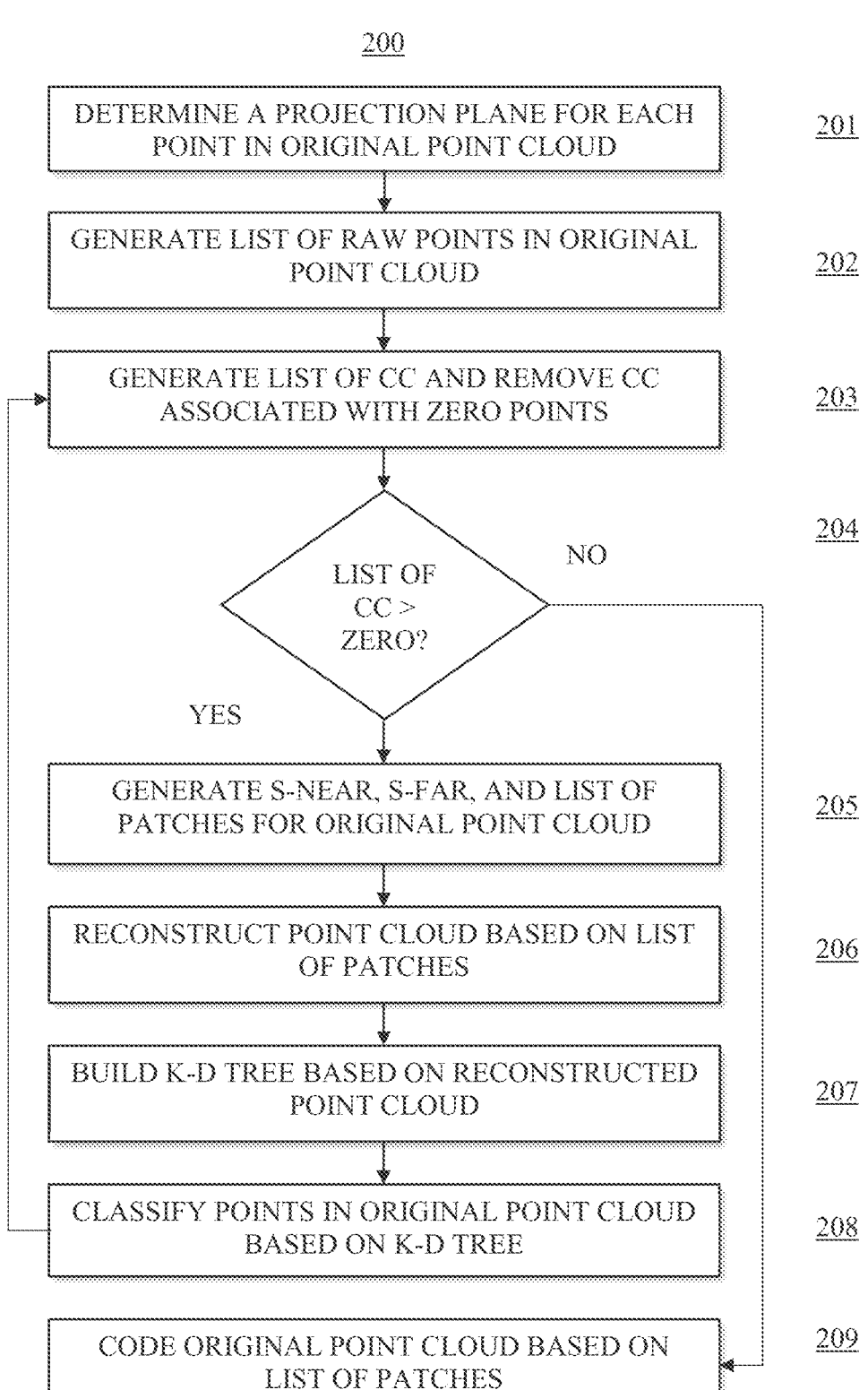

200

DETERMINE A PROJECTION PLANE FOR EACH
POINT IN ORIGINAL POINT CLOUD — 201

GENERATE LIST OF RAW POINTS IN ORIGINAL
POINT CLOUD — 202

GENERATE LIST OF CC AND REMOVE CC
ASSOCIATED WITH ZERO POINTS — 203

204

LIST OF
CC >
ZERO?

NO

YES

GENERATE S-NEAR, S-FAR, AND LIST OF
PATCHES FOR ORIGINAL POINT CLOUD — 205

RECONSTRUCT POINT CLOUD BASED ON LIST
OF PATCHES — 206

BUILD K-D TREE BASED ON RECONSTRUCTED
POINT CLOUD — 207

CLASSIFY POINTS IN ORIGINAL POINT CLOUD
BASED ON K-D TREE — 208

CODE ORIGINAL POINT CLOUD BASED ON
LIST OF PATCHES — 209

| REMOVE OUTLIERS | 401 |

| GENERATE FAR SURFACE | 402 |

| FILTER FAR SURFACE | 403 |

| GENERATE NEAR SURFACE | 405 |

| GENERATE LIST OF PATCHES BASED ON FILTERED FAR SURFACE AND NEAR SURFACE | 406 |

501

600

REMOVE OUTLIERS — 601

GENERATE NEAR SURFACE — 602

ADAPTIVELY FILTER NEAR SURFACE — 603

GENERATE FAR SURFACE — 605

GENERATE LIST OF PATCHES BASED ON FILTERED NEAR SURFACE AND FAR SURFACE — 606

700

REMOVE OUTLIERS    701

GENERATE NEAR SURFACE    702

ADAPTIVELY FILTER NEAR SURFACE    703

GENERATE FAR SURFACE    705

GENERATE LIST OF PATCHES BASED ON FILTERED NEAR SURFACE AND FAR SURFACE    706

SYSTEMS AND METHOD FOR ADAPTIVE FILTERING IN PATCH GENERATION FOR VIDEO-BASED POINT CLOUD CODING

CROSS-REFERENCE TO RELATED APPLICATION

This application is based on and claims priority to U.S. Provisional Application No. 63/286,434, filed on Dec. 6, 2021, in the U.S. Patent and Trademark Office, the disclosure of which is incorporated by reference herein in its entirety.

BACKGROUND

1. Field

The disclosure relates to Point Cloud Coding (PCC), and more specifically, systems and methods for adaptive filtering in patch generation for Video-based Point Cloud Coding (V-PCC).

2. Description of Related Art

A point cloud is used in many applications. For example, a point cloud is used in autonomous driving vehicles for object detection and localization, in geographic information systems (GIS) for mapping, and in cultural heritage preservation to visualize and archive cultural heritage objects and collections, etc.

Point clouds contain a set of high-dimensional points. For example, each point includes three-dimensional (3D) position information, and additional attributes such as color, reflectance, etc. Point clouds may be captured, for example, using multiple cameras and depth sensors, or laser imaging, detection, and ranging (LIDAR). To realistically represent a scene, point clouds may comprise thousands to billions of points.

Compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic point clouds.

SUMMARY

According to an aspect of the disclosure, there is provided a method that includes projecting a plurality of points included in a connected component (CC) to a projection plane associated with the CC; removing one or more outlier points from the plurality of points based on the projection to generate an updated CC; determining a first surface by selecting one or more points associated with the updated CC, based on the projection of the one or more points and a first selection criteria; adaptively filtering the one or more points selected for the first surface, by adjusting a grid size parameter based on one or more characteristics of the CC; determining a second surface by selecting one or more points associated with the updated CC, based on the projection of the one or more points and a second selection criteria; adding a patch corresponding to the filtered first surface and the second surface to a list of patches associated with an original point cloud; and coding the original point cloud based on the list of patches.

According to other aspects of the disclosure, an apparatus and computer readable medium consistent with the method are also provided.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 2 is a flow diagram illustrating a method of patch generation in Video-based Point Cloud Coding (V-PCC), according to various embodiments;

DETAILED DESCRIPTION

Figure 1:
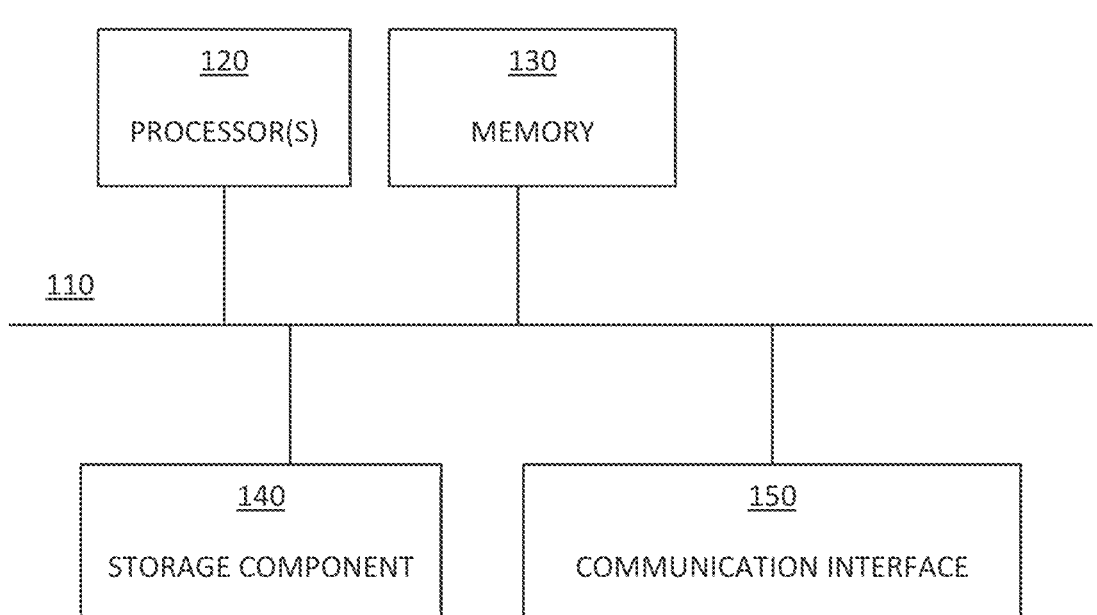
FIG. 1 is a diagram illustrating components of one or more devices, according to various embodiments.

According to various embodiment, adaptive filtering methods are provided, which can be applied to a patch generation process, such as patch generation in TMC2 or grided patch generation. The methods can be applied to any generated depth image including the near surface depth image and the far surface depth image.

According to various embodiment, the method may adjust a parameter T adaptively based on characteristics of a connected component. The characteristics that may be taken into account may include but not limited to the following:

Statistics of a depth of points in the connected component. For example, a depth range, a minimum/maximum depth value, a mean depth value, a depth variation, etc.

Statistics of a geometry of the points in the connected component. For example, a bounding box, a geometry distribution, etc.

Statistics of a color of the points in the connected component. For example, a color similarity/variation etc.

Statistics of other attributes (such as reflectance, timestamp, etc.) of the points in the connected component.

In some embodiments, only one characteristic discussed above may be taken into account, or multiple characteristics together may be taken into account when making the decision. Several thresholds and criteria may be define to determine the value of T for each connected component.

According to an aspect of the disclosure, there is provided a method that includes projecting a plurality of points included in a connected component (CC) to a projection plane associated with the CC, and removing one or more outlier points from the plurality of points based on the projection to generate an updated CC; determining a first surface by selecting one or more points associated with the updated CC, based on the projection of the one or more points and a first selection criteria; adaptively filtering the one or more points selected for the first surface, by adjusting a grid size parameter based on one or more characteristics of the CC; determining a second surface by selecting one or more points associated with the updated CC, based on the projection of the one or more points and a second selection criteria; adding a patch corresponding to the filtered first surface and the second surface to a list of patches associated with an original point cloud; and coding the original point cloud based on the list of patches.

The one or more characteristics of the CC may include at least one of statistics associated with a depth of the points in the CC, statistics associated with a geometry of the points in the CC, statistics associated with a color of the points in the CC, and statistics associated with other attributes of the points in the CC.

The first surface may be a near surface, the second surface may be a far surface, and the first selection criteria includes selecting one point having a smallest depth among two or more points associated with the updated CC, when the two or more points have a same projected coordinate.

The first surface may be a far surface, the second surface may be a near surface, and the first selection criteria includes selecting one point having a largest depth among two or more points associated with the updated CC, when the two or more points have a same projected coordinate.

The method of adaptively filtering the one or more points selected for the first surface may include determining an adjustment value based on the one or more characteristics of the CC; adjusting the grid size parameter based on the adjustment value; and filtering the one or more points selected for the first surface using a grid in the projection plane associated with the CC, where the grid may be based on the adjusted grid parameter.

The adjustment value may be based on an adjustment threshold value and a range between a smallest depth value and a largest depth value associated with the plurality of points included in the CC.

The adjustment value may be based on a plurality of adjustment threshold values and a range between a smallest depth value and a largest depth value associated with the plurality of points included in the CC.

The method may further include generating a list of CC, each CC associated with a projection plane, and including a raw point from the original point cloud and at least one neighbor point that neighbors the raw point in the original point cloud, such that the raw point and the at least one neighbor point have the same projection plane; projecting a plurality of points included in each CC to a projection plane associated with the CC, and removing one or more outlier points from the plurality of points based on the projection, to generate a list of updated CC; determining a first surface for each CC in the list of updated CC by selecting one or more points associated with the updated CC, based on the projection of the one or more points and the first selection criteria; adaptively filtering the one or more points selected for each first surface, by adjusting a grid size parameter based on one or more characteristics of the CC; determining a second surface for each CC in the list of updated CC by selecting one or more points associated with the updated CC, based on the projection of the one or more points and the second selection criteria; and adding a patch corresponding to each filtered first surface and each second surface to the list of patches associated with the original point cloud.

If a CC among the list of CC is associated with a number of points that is less than a threshold number, then the CC may be removed from the list of CC.

The method of coding the original point cloud based on the list of patches may include: identifying a plurality of points associated with a filtered first surface and a second surface corresponding to each patch in the list of patches; reconstructing a point cloud based on the identified plurality of points; building a K-D tree using the reconstructed point cloud; searching the K-D tree for a nearest neighbor point to each point in the original point cloud; and classifying each point in the original point cloud as a raw point if a distance between the point and the nearest neighbor point is greater than a distance threshold.

According to an aspect of the disclosure, there is provided an apparatus including a memory storing program code; and at least one processor configured to execute the program code and operate as instructed by the program code. The program code may include: projecting code configured to cause at least one of the at least one processor to project a plurality of points included in a connected component (CC) to a projection plane associated with the CC, and removing one or more outlier points from the plurality of points based on the projection to generate an updated CC; determining code configured to cause at least one of the at least one processor to determine a first surface by selecting one or more points associated with the updated CC, based on the projection of the one or more points and a first selection criteria; filtering code configured to cause at least one of the at least one processor to adaptively filter the one or more points selected for the first surface, by adjusting a grid size parameter based on one or more characteristics of the CC; determining code configured to cause at least one of the at least one processor to determine a second surface by selecting one or more points associated with the updated CC, based on the projection of the one or more points and a second selection criteria; adding code configured to cause at least one of the at least one processor to add a patch corresponding to the filtered first surface and the second surface to a list of patches associated with an original point cloud; and coding code configured to cause at least one of the at least one processor to code the original point cloud based on the list of patches.

The first surface may be a near surface, the second surface may be a far surface, and the program code further includes first selection criteria code configured to cause the at least one processor to select one point having a smallest depth among two or more points associated with the updated CC, when the two or more points have a same projected coordinate.

The first surface may be a far surface, the second surface may be a near surface, and the program code further includes first selection criteria code configured to cause the at least one processor to select one point having a largest depth among two or more points associated with the updated CC, when the two or more points have a same projected coordinate.

The filtering code may include: determining code configured to cause at least one of the at least one processor to determine an adjustment value based on the one or more characteristics of the CC; adjusting code configured to cause at least one of the at least one processor to adjust the grid size parameter based on the adjustment value; and filtering code configured to cause at least one of the at least one processor to filter the one or more points selected for the first surface using a grid in the projection plane associated with the CC, where the grid may be based on the adjusted grid parameter.

The adjustment value may be based on an adjustment threshold value and a range between a smallest depth value and a largest depth value associated with the plurality of points included in the CC.

According to an aspect of the disclosure, a non-transitory computer readable medium may be provided that stores computer readable program code which, when executed by a processor, causes the processor to at least: project a plurality of points included in a connected component (CC) to a projection plane associated with the CC, and removing one or more outlier points from the plurality of points based on the projection to generate an updated CC; determine a first surface by selecting one or more points associated with the updated CC, based on the projection of the one or more points and a first selection criteria; adaptively filter the one or more points selected for the first surface, by adjusting a grid size parameter based on one or more characteristics of the CC; determine a second surface by selecting one or more points associated with the updated CC, based on the projection of the one or more points and a second selection criteria; add a patch corresponding to the filtered first surface and the second surface to a list of patches associated with an original point cloud; and code the original point cloud based on the list of patches.

The first surface may be a near surface, the second surface may be a far surface, and the program code further cause the processor to at least select one point having a smallest depth among two or more points associated with the updated CC, when the two or more points have a same projected coordinate.

The first surface may be a far surface, the second surface may be a near surface, and the program code further cause the processor to at least select one point having a largest depth among two or more points associated with the updated CC, when the two or more points have a same projected coordinate.

The program code which cause the processor to adaptively filter the one or more points selected for the first surface, may further cause the processor to at least: determine an adjustment value based on the one or more characteristics of the CC; adjust the grid size parameter based on the adjustment value; and filter the one or more points selected for the first surface using a grid in the projection plane associated with the CC, where the grid may be based on the adjusted grid parameter.

The adjustment value may be based on an adjustment threshold value and a range between a smallest depth value and a largest depth value associated with the plurality of points included in the CC.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flow diagrams and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

FIG. 1 is a diagram illustrating components of one or more devices, according to various embodiments. Referring to FIG. 1, the device 100 may include a bus 110, one or more processor(s) 120, a memory 130, a storage component 140, and a communication interface 150. It is understood that one or more of the components may be omitted and/or one or more additional components may be included.

The bus 110 includes a component that permits communication among the components of the device 100. The processor 120 may be implemented in hardware, firmware, or a combination of hardware and software. The processor 120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a sparse tensor core, or another type of processing component. The processor 120 may include one or more processors. For example, the processor 120 may include one or more CPU, APU, FPGA, ASIC, sparse tensor core, or another type of processing component. The one or more processors of the processor 120 may be capable of being programmed to perform a function.

The memory 130 includes a random access memory (RAM), a read only memory (ROM), and/or another type of dynamic or static storage device (e.g., a flash memory, a magnetic memory, and/or an optical memory) that stores information and/or instructions for use by the processor 120.

The storage component 140 stores information and/or software related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 150 includes a transceiver-like component (e.g., a transceiver and/or a separate receiver and transmitter) that enables the device 100 to communicate with other devices, such as via a wired connection, a wireless connection, or a combination of wired and wireless connections. The communication interface 150 may permit the device 100 to receive information from another device and/or provide information to another device. For example, the communication interface 150 may include an Ethernet interface, an optical interface, a coaxial interface, an infrared interface, a radio frequency (RF) interface, a universal serial bus (USB) interface, a Wi-Fi interface, a cellular network interface, or the like.

The device 100 may perform one or more processes or functions described herein. The device 100 may perform operations based on the processor 120 executing software instructions stored by a non-transitory computer-readable medium, such as the memory 130 and/or the storage component 140. A computer-readable medium is defined herein as a non-transitory memory device. A memory device includes memory space within a single physical storage device or memory space spread across multiple physical storage devices.

Software instructions may be read into the memory 130 and/or the storage component 140 from another computer-readable medium or from another device via the communication interface 150. When executed, software instructions stored in the memory 130 and/or storage component 140 may cause the processor 120 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, device 100 may include additional components, fewer components, different components, or differently arranged components than those shown in FIG. 1. Additionally, or alternatively, a set of components (e.g., one or more components) of device 100 may perform one or more functions described as being performed by another set of components of device 100.

Any one of the operations or processes described below (e.g., FIGS. 2, 3, 4, 6, and 7) may be implemented by or using any one of the elements illustrated in FIG. 1.

FIG. 2 is a flow diagram illustrating a method of patch generation in Video-based Point Cloud Coding (V-PCC), according to various embodiments. Generally, V-PCC decomposes an input point cloud into a set of patches. In the MPEG point cloud coding (PCC) test model software "TMC2", for example, patch generation involves multiple steps.

At 201, the method 200 includes determining a projection plane for each point in a point cloud (original point cloud) based on a defined clustering criterion (e.g., based on associated normal vectors and neighboring points).

At 202, the method 200 includes generating a list of raw points in the original point cloud. Initially, no point in the list belongs to any patch.

At 203, the method 200 includes generating a list of connected components (CCs) based on the points in the list of raw points, by grouping raw points that have the same projection plane and are neighboring each other. A K-D tree may be used to select each raw point's neighboring points.

A number of points in each CC in the list of CCs is determined, and if the number of points is less than a threshold number of points, then the CC may be removed from the list of CCs.

At 204, the method 200 includes determining a number of CCs remaining in the list of CCs. If the number of CCs is zero, then the method 200 stops. If the number of CCs is greater than zero, then the method 200 proceeds to 205, and if not, then to 209.

At 205, the method 200 includes generating a near surface s-near, a far surface s-far, and a list of patches for the original point cloud. Generating the near surface s-near, the far surface s-far, and the list of patches is described in more detail in FIGS. 3, 4, 6, and 7.

At 206, the method 200 includes reconstructing a point cloud (reconstructed point cloud) based on points included in the near surface s-near and the far surface s-far, for all patches in the list of patches.

At 207, the method 200 includes building a K-D tree based on the reconstructed point cloud.

At 208, the method 200 includes, for each point in the original point cloud, searching the K-D tree based on the reconstructed point cloud for the point's nearest neighboring point. If a distance between a point in the original point cloud and its nearest neighboring point in the reconstructed point cloud is greater than a user-defined threshold, then the point is classified as a raw point. The method 200 returns to 203.

Figure 3:
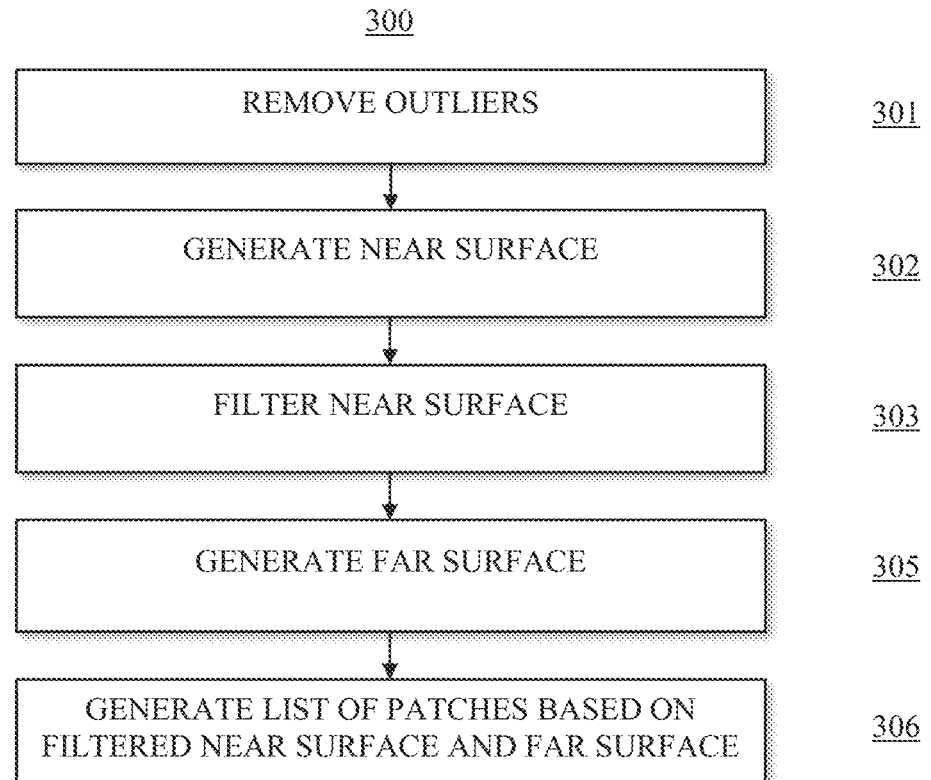
FIG. 3 is a flowchart illustrating a method of generating a near surface s-near, a far surface s-far, and a list of patches, based on a CC, according to various embodiments.

FIG. 3 is a flowchart illustrating a method of generating a near surface s-near, a far surface s-far, and a list of patches, based on a CC, according to various embodiments. The method 300 shown in FIG. 3 may be performed for each CC in the list of CCs at 205 in FIG. 2.

At 301, the method 300 includes removing outliers. The points in the CC may be projected to the projection plane associated with the CC. For example, a projected coordinate of a 3D point in a two-dimensional (2D) UV plane may be denoted as $(u_i, v_i)$, i=0, 1, . . . , N−1, where N is the number of points in the CC. A minimum value for the projected coordinates may be denoted as:

$$u_{min} = \min(u_0, u_1, \ldots, u_{N-1}), \text{ and}$$

$$v_{min} = \min(v_0, v_1, \ldots, v_{N-1}).$$

If $(u_i - u_{min}) > U_{thresold}$ or $(v_i - v_{min}) > U_{thresold}$, where $U_{thresold}$ and $V_{thresold}$ are user-defined thresholds, the i-th point is determined to be an outlier point and is removed from the CC. The resulting CC is referred to as the updated CC and is denoted as CC'.

At 302, the method 300 includes near surface generation. If the CC' is not empty (a number of points in the CC' is greater than zero), then for each 3D point in the CC', its projected coordinate in the 2D UV plane may be denoted as $(\hat{u}_i, \hat{v}_i)$, i=0, . . . , $\hat{N}$−1, where $\hat{N}$ is the number of points in the CC'. The method 300 may include determining a near surface s-near that is close to the projection plane associated with the CC' by selecting points in the CC'. The points in the CC' may be selected such that if one or more points have the same projected UV coordinate, then the point that has a smallest depth value is selected to be part of the near surface s-near. The depth value of a point may correspond to a distance from the point to the projection plane. The projected coordinates of the selected points may be denoted as $(\tilde{u}_i, \tilde{v}_i)$, i=0, . . . , $\tilde{N}$−1, and the depth value associated with each projected coordinate may be denoted as $\tilde{d}_i$, i=0, . . . , $\tilde{N}$−1, where $\tilde{N}$ is the number of points in the near surface s-near.

At 303, the method 300 includes near surface filtering. For a T×T grid in the projected plane, where T is a user-defined positive integer, a minimum depth value among points in the CC' that are projected to the T×T grid may be denoted as $\tilde{d}_{min}$. A minimum depth value among all the points in the CC' may be denoted as $\hat{d}_{min}$, and a maximum allowed depth representation may be denoted as $D_{max}$. For a user-defined threshold $d_{threshold}$, and a user-defined surface thickness $d_{surface}$, if a point $(\tilde{u},\tilde{v},\tilde{d})$ in the near surface $S_{near}$ that is projected to the T×T grid satisfies the condition:

$$\tilde{d} > (\tilde{d}_{min} + d_{threshold}) \text{ or } (\tilde{d} + d_{surface}) > (\hat{d}_{min} - D_{max}),$$

where $(\tilde{u},\tilde{v})$ is the projected coordinate and $\tilde{d}$ is the depth value of the point, then the point is removed from the near surface $S_{near}$.

At 305, the method 300 includes far surface generation. The method 300 may include determining a far surface s-far by selecting points in the CC' such that if one or more points have the same projected UV coordinate, then the point that has a largest depth value is selected to be part of the far surface s-far. For example, the far surface s-far may be initialized to be the same as the selected points $(\tilde{u}i, \tilde{v}_i)$, $i=0, \ldots, \tilde{N}-1$ for the near surface s-near. If multiple points in the CC' are projected to the same UV coordinate $(\tilde{u}_i, \tilde{v}_i)$, then the i-th point in the far surface $S_{far}$ is replaced with the point having the largest depth value such that a distance between this point and the point $\tilde{p}_i$ in $S_{near}$ is not greater than $d_{surface}$ and the two points' color values are close to each other.

At 304, the method 300 includes generating a list of patches. The method 300 may include adding a patch with the near surface and the far surface to a list of patches for the original point cloud.

Figure 4:
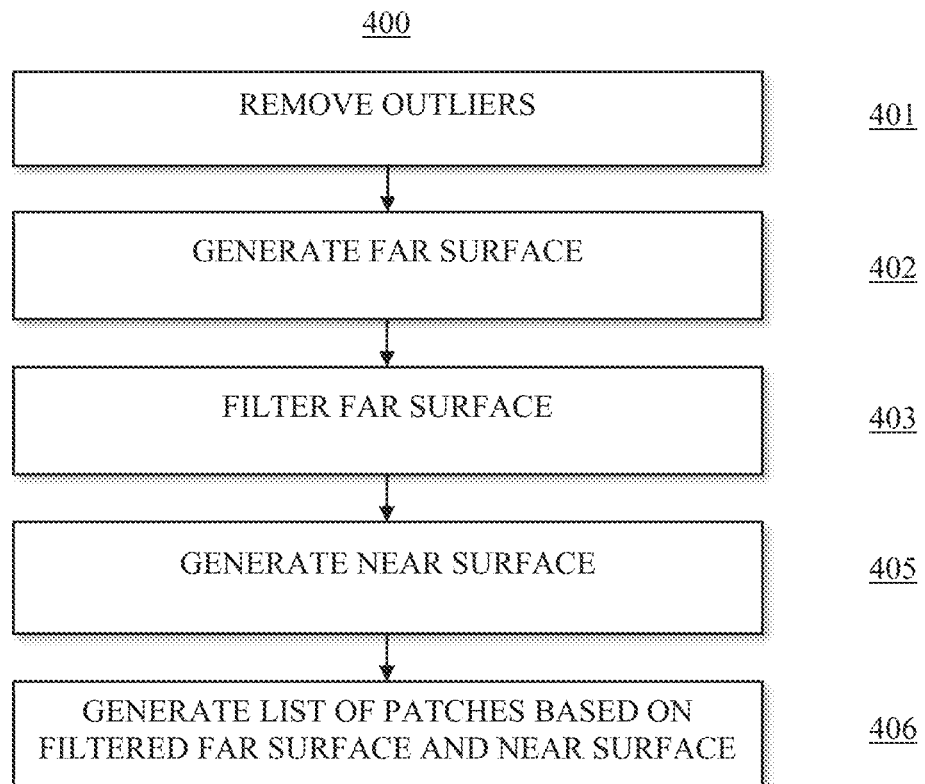
FIG. 4 is a flowchart illustrating another method of generating a near surface s-near, a far surface s-far, and a list of patches, based on a CC, according to various embodiments.

FIG. 4 is a flowchart illustrating another method of generating a near surface s-near, a far surface s-far, and a list of patches, based on a CC, according to various embodiments. The method 400 shown in FIG. 4 may be performed for each CC in the list of CCs at 205 in FIG. 2.

At 401, the method 400 includes removing outliers. The points in the CC may be projected to the projection plane associated with the CC. For example, a projected coordinate of a 3D point in a two-dimensional (2D) UV plane may be denoted as $(u_i,v_i)$, $i=0, 1, \ldots, N-1$, where N is the number of points in the CC. A minimum value for the projected coordinates may be denoted as:

$$u_{min} = \min(u_0, u_1, \ldots, u_{N-1}), \text{ and}$$

$$v_{min} = \min(v_0, v_1, \ldots, v_{N-1}).$$

If $(u_i - u_{min}) > U_{thresold}$ or $(v_i - v_{min}) > U_{thresold}$, where $U_{thresold}$ and $V_{thresold}$ are user-defined thresholds, the i-th point is determined to be an outlier point and is removed from the CC. The resulting CC is referred to as the updated CC and is denoted as CC'.

At 402, the method 400 includes far surface generation. If the CC' is not empty (a number of points in the CC' is greater than zero), then for each 3D point in the CC', its projected coordinate in the 2D UV plane may be denoted as $(\hat{u}_i, \hat{v}_i)$, $i=0, \ldots, \hat{N}-1$, where $\hat{N}$ is the number of points in the CC'. The method 300 may include determining a far surface s-far that is farther away from the projection plane associated with the CC' by selecting points in the CC' such that if one or more points have the same projected UV coordinate, then the point that has a largest projected value is selected to be part of the far surface s-far. The depth value of a point may correspond to a distance from the point to the projection plane. The projected coordinates of the selected points may be denoted as $(\tilde{u}_i, \tilde{v}_i)$, $i=0, \ldots, \tilde{N}-1$, and the depth value associated with each projected coordinate may be denoted as $\tilde{d}_i$, $i=0, \ldots, \tilde{N}-1$, where $\tilde{N}$ is the number of points in the far surface s-far.

At 403, the method 400 includes far surface filtering. For a T×T grid in the projected plane, where T is a user-defined positive integer, a maximum depth value among points in the CC' that are projected to the T×T grid may be denoted as $\tilde{d}_{max}$. A maximum depth value among all the points in the CC' may be denoted as $\hat{d}_{max}$, and a maximum allowed depth representation may be denoted as $D_{max}$. For a user-defined threshold $d_{threshold}$, and a user-defined surface thickness $d_{surface}$, if a point $(\tilde{u},\tilde{v},\tilde{d})$ in the far surface $S_{far}$ that is projected to the T×T grid satisfies the condition:

$$\tilde{d} > (\tilde{d}_{max} - d_{threshold}) \text{ or } (\tilde{d} - d_{surface}) > (\hat{d}_{max} - D_{max}),$$

where $(\tilde{u},\tilde{v})$ is the projected coordinate and $\tilde{d}$ is the depth value of the point, then the point is removed from the far surface $S_{far}$.

At 405, the method 400 includes near surface generation. The method 400 may include determining a near surface s-near by selecting points in the CC' such that if one or more points have the same projected UV coordinate, then the point that has a smallest depth value is selected to be part of the near surface s-near. For example, the near surface s-near may be initialized to be the same as the selected points $(\tilde{u}, \tilde{v}_i)$, $i=0, \ldots, \tilde{N}-1$ for the far surface s-far. If multiple points in the CC' are projected to the same UV coordinate $(\tilde{u}_i, \tilde{v}_i)$, then the i-th point in the near surface $S_{near}$ is replaced with the point having the smallest depth value such that a distance between this point and the point $\tilde{p}_i$ in $S_{far}$ is not greater than $d_{surface}$ and the two points' color values are close to each other.

At 406, the method 400 includes generating a list of patches. The method 400 may include adding a patch with the near surface and the far surface to a list of patches for the original point cloud.

Figure 5:
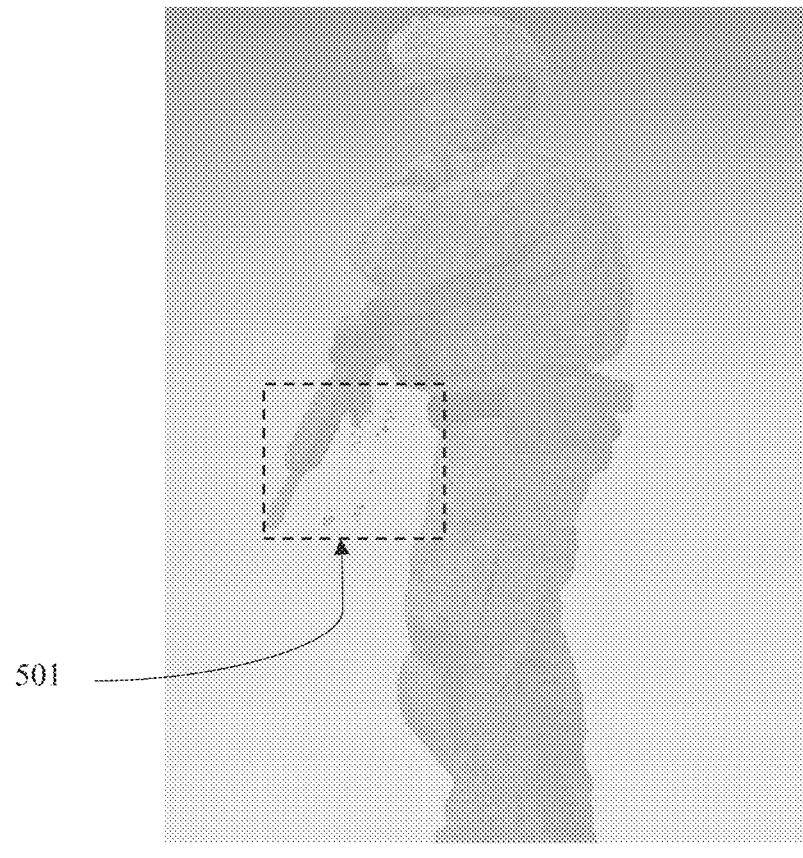
FIG. 5 illustrates an sample reconstructed point cloud.

FIG. 5 illustrates an sample reconstructed point cloud. Referring to 303 in FIG. 3, and 403 in FIG. 4, the grid size T×T is fixed during an encoding process. If the parameter T is small, artifacts may appear. However, when T is large, many small patches may be produced and the coding efficiency may be reduced. As shown in FIG. 5, in an experiment using grid-based patch generation where T=4, coding artifacts may be observed in the marked area 501.

According to various embodiments, the method 300 or the method 400 may include performing adaptive filtering. For example, at 303, the method 300 may include adaptively filtering the generated near surface s-near, and at 403, the method 400 may include adaptively filtering the generated far surface s-far. That is, the parameter T may be adaptively adjusted based on characteristics of the CC.

Characteristics of a CC used to adaptively adjust the parameter T may include statistics associated with a depth of the points in the CC. For example, a depth range, a minimum/maximum depth value, a mean depth value, a depth variation, etc.

Characteristics of a CC used to adaptively adjust the parameter T may include statistics associated with a geometry of the points in the CC. For example, a bounding box, geometry distribution, etc.

Characteristics of a CC used to adaptively adjust the parameter T may include statistics associated with a color of the points in the CC. For example, a color similarity/variation etc.

Characteristics of a CC used to adaptively adjust the parameter T may include statistics associated with other attributes (e.g., reflectance, timestamp, etc.) of the points in the CC.

The parameter T may be adaptively adjusted based on only one characteristics or based on multiple characteristics together. Additionally, one or more thresholds and/or criteria may be defined (e.g., by a user) to determine a value for the parameter T for each CC in a list of CCs.

Figure 6:
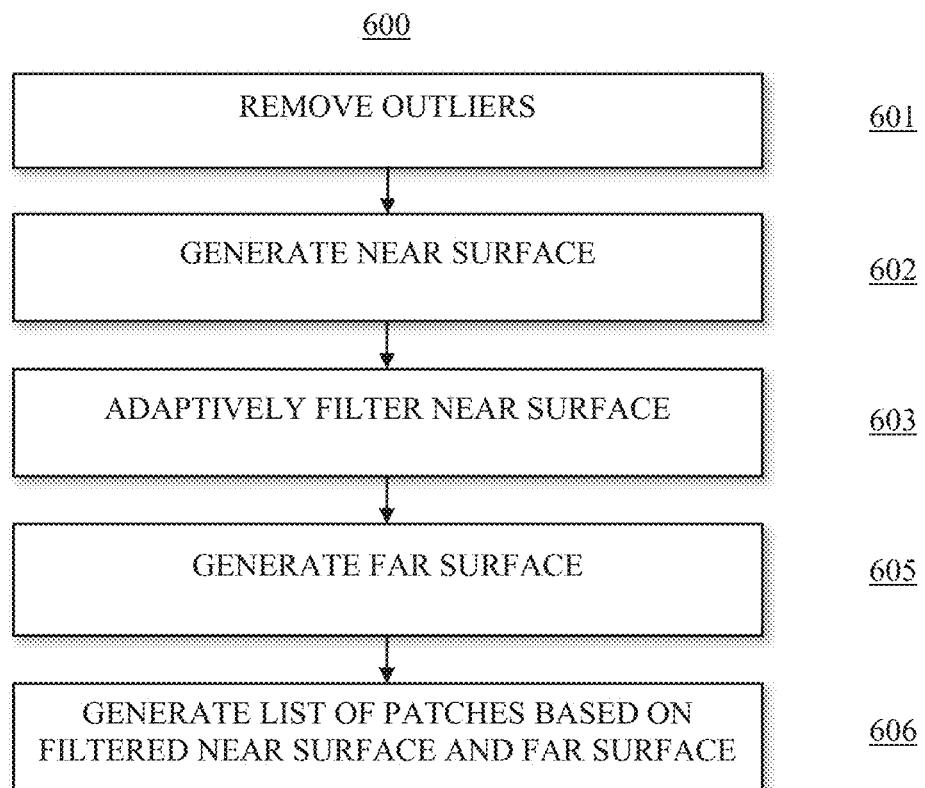
FIG. 6 is a flowchart illustrating a method of generating a near surface s-near, a far surface s-far, and a list of patches, based on a CC, by performing adaptive filtering, according to various embodiments.

FIG. 6 is a flowchart illustrating a method of generating a near surface s-near, a far surface s-far, and a list of patches, based on a CC, by performing adaptive filtering, according to various embodiments. The method 600 shown in FIG. 6 may be performed for each CC in the list of CCs at 205 in FIG. 2.

At 601, the method 600 includes removing outliers. The points in the CC may be projected to the projection plane associated with the CC. For example, a projected coordinate of a 3D point in a two-dimensional (2D) UV plane may be denoted as $(u_i, v_i)$, i=0, 1, . . . , N−1, where N is the number of points in the CC. A minimum value for the projected coordinates may be denoted as:

$$u_{min} = \min(u_0, u_1, \ldots, u_{N-1}), \text{ and}$$

$$v_{min} = \min(v_0, v_1, \ldots, v_{N-1}).$$

If $(u_i - u_{min}) > U_{thresold}$ or $(v_i - v_{min}) > U_{thresold}$, where $U_{thresold}$ and $V_{thresold}$ are user-defined thresholds, the i-th point is determined to be an outlier point and is removed from the CC. The resulting CC is referred to as the updated CC and is denoted as CC'.

At 602, the method 600 includes near surface generation. If the CC' is not empty (a number of points in the CC' is greater than zero), then for each 3D point in the CC', its projected coordinate in the 2D UV plane may be denoted as $(\hat{u}_i, \hat{v}_i)$, i=0, . . . , $\hat{N}$−1, where $\hat{N}$ is the number of points in the CC'. The method 600 may include determining a near surface s-near that is close to the projection plane associated with the CC' by selecting points in the CC'. The points in the CC' may be selected such that if one or more points have the same projected UV coordinate, then the point that has a smallest depth value is selected to be part of the near surface s-near. The depth value of a point may correspond to a distance from the point to the projection plane. The projected coordinates of the selected points may be denoted as $(\tilde{u}_i, \tilde{v}_i)$, i=0, . . . , $\tilde{N}$−1, and the depth value associated with each projected coordinate may be denoted as $\tilde{d}_i$, i=0, . . . , $\tilde{N}$−1, where $\tilde{N}$ is the number of points in the near surface s-near.

At 603, the method 600 includes near surface adaptive filtering. In one embodiment, the method 600 determines a range of depth for points in the CC. For example, the method 600 may include identifying a smallest depth value, denoted as $d_{min}$, and a largest depth value, denoted as $d_{max}$. The range of depth may be determined according to:

$$d_{range} = |d_{max} - d_{min}|,$$

where the operation |x| is the absolute value of x. The method 600 may include determining the parameter T based on the following:

$$T = \begin{cases} T_1 & \text{if } d_{range} > d_{Th} \\ T_2 & \text{else} \end{cases},$$

where $d_{Th}$ is a positive integer threshold value (e.g., 64, 128, etc.), $T_1$ and $T_2$ are two positive integer values such that $T_1 > T_2$ (e.g., $T_1 = 32$ and $T_1 = 4$). Here, the method 600 selects a larger value for T when $d_{range}$ is relatively large and the artifacts are likely to appear.

For a T×T grid in the projected plane, based on the determined value for T, a minimum depth value among points in the CC' that are projected to the T×T grid may be denoted as $\tilde{d}_{min}$. A minimum depth value among all the points in the CC' may be denoted as $\hat{d}_{min}$, and a maximum allowed depth representation may be denoted as $D_{max}$ For a user-defined threshold $d_{threshold}$, and a user-defined surface thickness $d_{surface}$, if a point $(\tilde{u}, \tilde{v}, \tilde{d})$ in the near surface $S_{near}$ that is projected to the T×T grid satisfies the condition:

$$\tilde{d} > (\tilde{d}_{max} - d_{threshold}) \text{ or } (\tilde{d} - d_{surface}) > (\tilde{d}_{max} - D_{max}),$$

where $(\tilde{u}, \tilde{v})$ is the projected coordinate and $\tilde{d}$ is the depth value of the point, then the point is removed from the near surface $S_{near}$.

At 605, the method 600 includes far surface generation. The method 600 may include determining a far surface s-far by selecting points in the CC' such that if one or more points have the same projected UV coordinate, then the point that has a largest depth value is selected to be part of the far surface s-far. For example, the far surface s-far may be initialized to be the same as the selected points $(\tilde{u}_i, \tilde{v}_i)$, i=0, . . . , $\tilde{N}$−1 for the near surface s-near. If multiple points in the CC' are projected to the same UV coordinate $(\tilde{u}_i, \tilde{v}_i)$, then the i-th point in the far surface $S_{far}$ is replaced with the point having the largest depth value such that a distance between this point and the point $\tilde{p}_i$ in $S_{near}$ is not greater than $d_{surface}$ and the two points' color values are close to each other.

At 606, the method 600 includes generating a list of patches. The method 600 may include adding a patch with the near surface and the far surface to a list of patches for the original point cloud.

Figure 7:
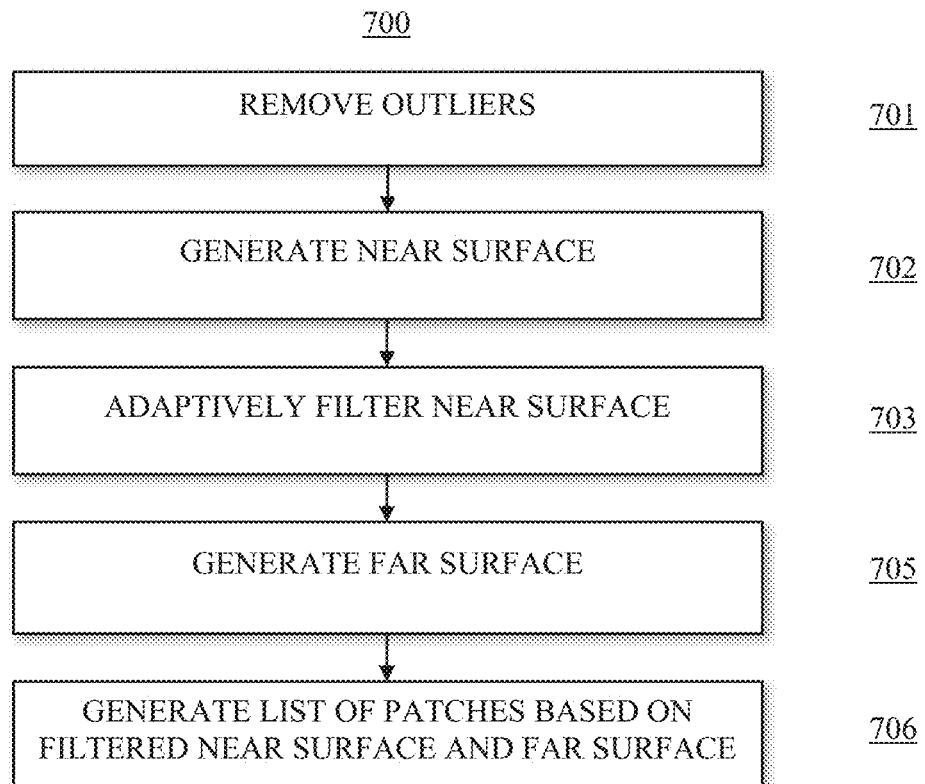
FIG. 7 is a flowchart illustrating another method of generating a near surface s-near, a far surface s-far, and a list of patches, based on a CC, by performing adaptive filtering, according to various embodiments.

FIG. 7 is a flowchart illustrating another method of generating a near surface s-near, a far surface s-far, and a list of patches, based on a CC, by performing adaptive filtering, according to various embodiments. The method 700 shown in FIG. 7 may be performed for each CC in the list of CCs at 205 in FIG. 2.

At 701, the method 700 includes removing outliers. The points in the CC may be projected to the projection plane associated with the CC. For example, a projected coordinate of a 3D point in a two-dimensional (2D) UV plane may be denoted as $(u_i, v_i)$, i=0, 1, . . . , N−1, where N is the number of points in the CC. A minimum value for the projected coordinates may be denoted as:

$$u_{min} = \min(u_0, u_1, \ldots, u_{N-1}), \text{ and}$$

$$v_{min} = \min(v_0, v_1, \ldots, v_{N-1}).$$

If $(u_i - u_{min}) > U_{thresold}$ or $(v_i - v_{min}) > U_{thresold}$, where $U_{thresold}$ and $V_{thresold}$ are user-defined thresholds, the i-th point is determined to be an outlier point and is removed from the CC. The resulting CC is referred to as the updated CC and is denoted as CC'.

At 702, the method 700 includes far surface generation. If the CC' is not empty (a number of points in the CC' is greater than zero), then for each 3D point in the CC', its projected coordinate in the 2D UV plane may be denoted as $(\hat{u}_i, \hat{v}_i)$, i=0, . . . , $\hat{N}$−1, where $\hat{N}$ is the number of points in the CC'. The method 300 may include determining a far surface s-far that is farther away from the projection plane associated with the CC' by selecting points in the CC' such that if one or more points have the same projected UV coordinate, then the point that has a largest depth value is selected to be part of the far surface s-far. The depth value of a point may correspond to a distance from the point to the projection plane. The projected coordinates of the selected points may be denoted as $(\tilde{u}_i, \tilde{v}_i)$, i=0, . . . , $\tilde{N}$−1, and the depth value associated with each projected coordinate may be denoted as $\tilde{d}_i$, i=0, . . . , $\tilde{N}$−1, where $\tilde{N}$ is the number of points in the far surface s-far.

At 703, the method 700 includes far surface adaptive filtering. In one embodiment, the method 700 may include using multiple range thresholds to obtain finer granularity for the value of T. For example, two range thresholds may be used as follows:

$$T = \begin{cases} T_1 & \text{if } d_{range} > d_{Th1} \\ T_2 & \text{if } d_{Th1} \geq d_{range} > d_{Th2} , \\ T_3 & \text{else} \end{cases}$$

where $d_{Th1}$ and $d_{Th2}$ are two positive integer threshold values such that $d_{Th1} > d_{Th2}$, and where $T_1$, $T_2$ and $T_2$ are three positive integer values such that $T_1 > T_2 > T_3$.

For a T×T grid in the projected plane, based on the determined value for T, a maximum depth value among points in the CC' that are projected to the T×T grid may be denoted as $\tilde{d}_{max}$. A maximum depth value among all the points in the CC' may be denoted as $\hat{d}_{max}$, and a maximum allowed depth representation may be denoted as $D_{max}$. For a user-defined threshold $d_{threshold}$, and a user-defined surface thickness $d_{surface}$, if a point $(\tilde{u}, \tilde{v}, \tilde{d})$ in the far surface $S_{far}$ that is projected to the T×T grid satisfies the condition:

$$\tilde{d} > (\tilde{d}_{min} + d_{threshold}) \text{ or } (\tilde{d} + d_{surface}) > (\hat{d}_{min} - D_{max}),$$

where $(\tilde{u}, \tilde{v})$ is the projected coordinate and $\tilde{d}$ is the depth value of the point, then the point is removed from the far surface $S_{far}$.

At 705, the method 700 includes near surface generation. The method 700 may include determining a near surface s-near by selecting points in the CC' such that if one or more points have the same projected UV coordinate, then the point that has a smallest depth value is selected to be part of the near surface s-near. For example, the near surface s-near may be initialized to be the same as the selected points $(\tilde{u}_i, \tilde{v}_i)$, i=0, . . . , $\tilde{N}$−1 for the far surface s-far. If multiple points in the CC' are projected to the same UV coordinate $(\tilde{u}_i, \tilde{v}_i)$, then the i-th point in the near surface $S_{near}$ is replaced with the point having the smallest depth value such that a distance between this point and the point $\tilde{p}_i$ in $S_{far}$ is not greater than $d_{surface}$ and the two points' color values are close to each other.

At 706, the method 700 includes generating a list of patches. The method 700 may include adding a patch with the near surface and the far surface to a list of patches for the original point cloud.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flow diagram and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow diagram and/or block diagram block or blocks.

The flow and block diagrams in the Figures illustrate the architecture, functionality, and operation of possible implementations of systems, methods, and computer readable media according to various embodiments. In this regard, each block in the flow diagram or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method comprising:

projecting a plurality of points included in a connected component (CC) onto a projection plane associated with the CC;

removing one or more outlier points from the plurality of points based on the projected points to generate an updated CC;

determining a first surface by selecting one or more points associated with the updated CC, based on the projected points and a first selection criteria;

adaptively filtering the one or more points selected for the first surface, by adjusting a grid size parameter based on one or more characteristics of the CC including at least one of statistics associated with a depth of the points in the CC, statistics associated with a geometry of the points in the CC, statistics associated with a color of the points in the CC, and statistics associated with other attributes of the points in the CC;

determining a second surface by selecting one or more points associated with the updated CC, based on the projected points and a second selection criteria;

adding a patch corresponding to the filtered points for the first surface and the second surface to a list of patches associated with an original point cloud; and coding the original point cloud based on the list of patches.

2. The method of claim 1, wherein the first surface is a near surface, the second surface is a far surface, and the first selection criteria comprises selecting one point having a smallest depth among two or more points associated with the updated CC, when the two or more points have a same projected coordinate.

3. The method of claim 1, wherein the first surface is a far surface, the second surface is a near surface, and the first selection criteria comprises selecting one point having a largest depth among two or more points associated with the updated CC, when the two or more points have a same projected coordinate.

4. The method of claim 1, wherein the adaptively filtering comprises:

determining an adjustment value based on the one or more characteristics of the CC;

adjusting the grid size parameter based on the adjustment value; and filtering the one or more points selected for the first surface using a grid in the projection plane associated with the CC, wherein the grid is based on the adjusted grid parameter.

5. The method of claim 4, wherein the adjustment value is based on an adjustment threshold value and a range between a smallest depth value and a largest depth value associated with the plurality of points included in the CC.

6. The method of claim 4, wherein the adjustment value is based on a plurality of adjustment threshold values and a range between a smallest depth value and a largest depth value associated with the plurality of points included in the CC.

7. The method of claim 1, further comprising:

generating a list of CCs, each CC associated with the projection plane, and including a raw point from the original point cloud and at least one neighbor point that neighbors the raw point in the original point cloud, such that the raw point and the at least one neighbor point have the same projection plane;

projecting the plurality of points included in each CC onto the projection plane associated with the CC, and removing one or more outlier points from the plurality of points based on the projected points, to generate a list of updated CC;

determining the first surface for each CC in the list of updated CC by selecting one or more points associated with the updated CC, based on the projection of the one or more points and the first selection criteria;

adaptively filtering the one or more points selected for each first surface, by adjusting the grid size parameter based on one or more characteristics of the CC;

determining the second surface for each CC in the list of updated CC by selecting one or more points associated with the updated CC, based on the projected points and the second selection criteria; and adding a patch corresponding to the filtered points for each first surface and each second surface to the list of patches associated with the original point cloud.

8. The method of claim 7, wherein when a CC among the list of CCs is associated with a number of points that is less than a threshold number, then the CC is removed from the list of CCs.

9. The method of claim 7, wherein coding the original point cloud based on the list of patches comprises:

identifying a plurality of points associated with a filtered first surface and a second surface corresponding to each patch in the list of patches;

reconstructing a point cloud based on the identified plurality of points;

building a K-D tree using the reconstructed point cloud;

searching the K-D tree for a nearest neighbor point to each point in the original point cloud; and classifying each point in the original point cloud as a raw point when a distance between the point and the nearest neighbor point is greater than a distance threshold.

10. An apparatus comprising:

a memory storing program code; and at least one processor configured to execute the program code and operate as instructed by the program code, the program code including:

projecting code configured to cause at least one of the at least one processor to project a plurality of points included in a connected component (CC) onto a projection plane associated with the CC;

removing code configured to cause at least one of the at least one processor to remove one or more outlier points from the plurality of points based on the projected points to generate an updated CC;

determining code configured to cause at least one of the at least one processor to determine a first surface by selecting one or more points associated with the updated CC, based on the projection of the one or more points and a first selection criteria;

filtering code configured to cause at least one of the at least one processor to adaptively filter the one or more points selected for the first surface, by adjusting a grid size parameter based on one or more characteristics of the CC including at least one of statistics associated with a depth of the points in the CC, statistics associated with a geometry of the points in the CC, statistics associated with a color of the points in the CC, and statistics associated with other attributes of the points in the CC;

determining code configured to cause at least one of the at least one processor to determine a second surface by selecting one or more points associated with the updated CC, based on the projected points and a second selection criteria;

adding code configured to cause at least one of the at least one processor to add a patch corresponding to the filtered points for the first surface and the second surface to a list of patches associated with an original point cloud; and coding code configured to cause at least one of the at least one processor to code the original point cloud based on the list of patches.

11. The apparatus of claim 10, wherein the first surface is a near surface, the second surface is a far surface, and the program code further includes first selection criteria code configured to cause the at least one processor to select one point having a smallest depth among two or more points associated with the updated CC, when the two or more points have a same projected coordinate.

12. The apparatus of claim 10, wherein the first surface is a far surface, the second surface is a near surface, and the program code further includes first selection criteria code configured to cause the at least one processor to select one point having a largest depth among two or more points associated with the updated CC, when the two or more points have a same projected coordinate.

13. The apparatus of claim 10, wherein the filtering code comprises:

determining code configured to cause at least one of the at least one processor to determine an adjustment value based on the one or more characteristics of the CC;

adjusting code configured to cause at least one of the at least one processor to adjust the grid size parameter based on the adjustment value; and filtering code configured to cause at least one of the at least one processor to filter the one or more points selected for the first surface using a grid in the projection plane associated with the CC, wherein the grid is based on the adjusted grid parameter.

14. The apparatus of claim 13, wherein the adjustment value is based on an adjustment threshold value and a range between a smallest depth value and a largest depth value associated with the plurality of points included in the CC.

15. A non-transitory computer readable medium that stores computer readable program code which, when executed by a processor, causes the processor to at least:

project a plurality of points included in a connected component (CC) to a projection plane associated with the CC;

remove one or more outlier points from the plurality of points based on the projected points to generate an updated CC;

determine a first surface by selecting one or more points associated with the updated CC, based on the projected points and a first selection criteria;

adaptively filter the one or more points selected for the first surface, by adjusting a grid size parameter based on one or more characteristics of the CC including at least one of statistics associated with a depth of the points in the CC, statistics associated with a geometry of the points in the CC, statistics associated with a color of the points in the CC, and statistics associated with other attributes of the points in the CC;

determine a second surface by selecting one or more points associated with the updated CC, based on the projection of the one or more points and a second selection criteria;

add a patch corresponding to the filtered points for the first surface and the second surface to a list of patches associated with an original point cloud; and code the original point cloud based on the list of patches.

16. The non-transitory computer readable medium of claim 15, wherein the first surface is a near surface, the second surface is a far surface, and the program code further cause the processor to at least select one point having a smallest depth among two or more points associated with the updated CC, when the two or more points have a same projected coordinate.

17. The non-transitory computer readable medium of claim 15, wherein the first surface is a far surface, the second surface is a near surface, and the program code further cause the processor to at least select one point having a largest depth among two or more points associated with the updated CC, when the two or more points have a same projected coordinate.

18. The non-transitory computer readable medium of claim 15, wherein the program code which causes the processor to adaptively filter, further cause the processor to at least:

determine an adjustment value based on the one or more characteristics of the CC;

adjust the grid size parameter based on the adjustment value; and filter the one or more points selected for the first surface using a grid in the projection plane associated with the CC, wherein the grid is based on the adjusted grid parameter.

19. The non-transitory computer readable medium of claim 18, wherein the adjustment value is based on an adjustment threshold value and a range between a smallest depth value and a largest depth value associated with the plurality of points included in the CC.

\*    \*    \*    \*    \*